US012653217B2

(12) United States Patent
Kim et al.

(10) Patent No.: US 12,653,217 B2
(45) Date of Patent: Jun. 16, 2026

(54) COMPOSITION FOR ENHANCING UMAMI COMPRISING TYROSINE-AMINO ACID PEPTIDE AND USE THEREOF

(71) Applicant: INDUSTRY-ACADEMIC COOPERATION FOUNDATION GYEONGSANG NATIONAL UNIVERSITY, Gyeongsangnam-do (KR)

(72) Inventors: Hyun Joon Kim, Gyeongsangnam-do (KR); Eui-Cheol Shin, Gyeongsangnam-do (KR)

(73) Assignee: INDUSTRY-ACADEMIC COOPERATION FOUNDATION GYEONGSANG NATIONAL UNIVERSITY, Gyeongsangnam-do (KR)

( * ) Notice: Subject to any disclaimer, the term of this patent is extended or adjusted under 35 U.S.C. 154(b) by 364 days.

(21) Appl. No.: 18/277,682

(22) PCT Filed: Feb. 16, 2022

(86) PCT No.: PCT/KR2022/095033
§ 371 (c)(1),
(2) Date: Aug. 17, 2023

(87) PCT Pub. No.: WO2022/177418
PCT Pub. Date: Aug. 25, 2022

(65) Prior Publication Data
US 2024/0122219 A1     Apr. 18, 2024

(30) Foreign Application Priority Data
Feb. 22, 2021     (KR) ........................ 10-2021-0023125

(51) Int. Cl.
*A23L 27/21*          (2016.01)

(52) U.S. Cl.
CPC .................................... *A23L 27/21* (2016.08)

(58) Field of Classification Search
CPC .......... A23L 27/20; A23L 27/21; A23L 27/88; C07K 5/06; C07K 5/0608; C07K 5/06078; C07K 5/06008
See application file for complete search history.

(56) References Cited

U.S. PATENT DOCUMENTS

2006/0217321 A1*   9/2006  Ozeki ..................... A61P 25/00
                                                                514/17.7
2016/0376263 A1*  12/2016  Patron .................. A61K 8/4973
                                                                514/784

(Continued)

FOREIGN PATENT DOCUMENTS

CN        103275176 A  *  9/2013
CN        106544381 A       3/2017

(Continued)

OTHER PUBLICATIONS

International Search Report for PCT/KR2022/095033 mailed on Jun. 7, 2022.

(Continued)

*Primary Examiner* — Changqing Li
(74) *Attorney, Agent, or Firm* — The PL Law Group, PLLC

(57)          ABSTRACT

A composition includes tyrosine-amino acid peptide as effective component. The composition may enhance umami. The amino acid may be lysine, methionine, valine, serine, cysteine, arginine, asparagine, aspartic acid, alanine, isoleucine, leucine, threonine, tyrosine, glutamine, glutamic acid, glycine, histidine, phenylalanine, proline, or tryptophan. The composition may further includes glutamine. The composition may be added to food to enhance umami.

7 Claims, 2 Drawing Sheets

(56)         References Cited

U.S. PATENT DOCUMENTS

| | | | |
|---|---|---|---|
| 2019/0254318 | A1 | 8/2019 | Didzbalis et al. |
| 2020/0178586 | A1 | 6/2020 | Shibata et al. |

FOREIGN PATENT DOCUMENTS

| | | | | | |
|---|---|---|---|---|---|
| CN | 107226835 | A | | 10/2017 | |
| CN | 109561728 | A | * | 4/2019 | ............. A61P 25/24 |
| CN | 110305192 | B | | 11/2020 | |
| JP | 2002-255994 | A | | 9/2002 | |
| JP | 2006160649 | A | * | 6/2006 | |
| KR | 20020072486 | A | * | 9/2002 | ........... A23C 9/1307 |
| KR | 10-2006-0030038 | A | | 4/2006 | |
| KR | 10-1328091 | B1 | | 11/2013 | |
| KR | 10-1694810 | B1 | | 1/2017 | |
| WO | WO-2006084560 | A1 | * | 8/2006 | ............. A23L 33/15 |

OTHER PUBLICATIONS

European Search Report For EP 22756616.3 issued on Mar. 10, 2025 from European patent office in a counterpart European patent application.

* cited by examiner

COMPOSITION FOR ENHANCING UMAMI COMPRISING TYROSINE-AMINO ACID PEPTIDE AND USE THEREOF

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2022/095033, filed Feb. 16, 2022, which claims priority to the benefit of Korean Patent Application No. 10-2021-0023125 filed in the Korean Intellectual Property Office on Feb. 22, 2021, the entire contents of which are incorporated herein by reference.

BACKGROUND

1. Technical Field

The present invention relates to a composition for enhancing umami comprising tyrosine-amino acid peptide as an effective component and use thereof.

2. Background Art

Umami (i.e., Ji-mi) is the fifth taste that the tongue can perceive, in addition to sweet, sour, salty, and bitter tastes. In Japanese, "umami" means "a pleasant savory taste." The theory of the fifth taste originated in 1908 when Dr. Kikunae Ikeda, a Doctor of Science at the Tokyo Imperial University in Japan, discovered a unique taste in a seaweed soup made with kombu as the main ingredient. He isolated the molecule responsible for this taste, which is known as monosodium glutamate. Since then, it has been found that nucleotide compounds (such as inosinic acid and guanylic acid) are components that contribute to the special taste in food, and this taste is called umami. Dr. Ikeda argued that umami cannot be produced by mixing the four primary tastes of humans in any combination, suggesting it as another primary taste sensation. In 1997, Dr. Nirupa Chaudhari and Dr. Stephen Roper from the University of Miami in USA discovered that a specific taste bud on animal tongues responded exclusively to monosodium glutamate (MSG). They referred to this taste as "umami", which has been described as the fifth taste sensation mentioned earlier. The discovery of umami has led to the use of monosodium glutamate (MSG) as a representative substance for enhancing the taste of food.

Recently, there has been a rapid increase in the market for health-oriented and naturally sourced seasoning material, and the expansion of materials utilizing yeast extract and natural extract continues. However, seasoning materials based on natural extract have lower umami intensity compared to MSG and are characterized by higher market prices, making it difficult for them to be universally applied in the food industry.

Peptides play a role in various biological regulatory functions, including supplying various types of amino acids that are the basis of umami, sweet, bitter, and sour tastes, as well as contributing to sensory functions such as taste, solubility, and emulsion property. Several biological functions have been also reported, such as anticancer effect, blood pressure reduction, serum cholesterol reduction, immune enhancement, and promotion of calcium absorption.

From the viewpoint of food science, peptides are known to be the substance that imparts the basic tastes of sweetness, saltiness, sourness, bitterness, and umami to food. In addition to these tastes, in Japan, peptides are gaining attention as a substance that can provide a sustained taste in food, give a rich and lingering sensation of flavor, and harmonize the tastes of saltiness and sourness, known as "kokumi." In Korean Patent Registration No. 1328091, an amino acid seasoning composition containing L-glutamate and L-lysine is disclosed. Korean Patent Registration No. 1694810 discloses a method for reducing the negative taste of an amino acid seasoning composition. However, they are different from the composition of the present invention, which comprises a tyrosine-amino acid peptide for enhancing umami.

SUMMARY

The present invention is devised under the circumstances described in the above, and it has been completed by the inventors who found that a tyrosine-amino acid peptide with oxidative stress reduction effects can enhance the umami in food.

To achieve the object described in the above, the present invention provides a composition for enhancing umami comprising tyrosine-amino acid peptide as an effective component.

The present invention further provides a processed food for enhancing umami comprising the above composition.

The present invention further provides a method for producing a processed food with enhanced umami characterized by mixing a tyrosine-amino acid peptide in food.

The present invention further provides a processed food with enhanced umami produced by the above method.

The present invention still further provides a method for enhancing umami of processed food characterized by mixing a tyrosine-amino acid peptide in food.

Existing food additives used to enhance umami often face concerns regarding their potential harmful effects on human health. In contrast, the tyrosine-containing peptide of the present invention not only possesses anti-oxidative effects by having the effect of reducing oxidative stress but also has the ability of enhancing umami. Therefore, it is expected that, instead of the potential hazards associated with traditional materials for having umami, the tyrosine-amino acid peptide with the effect of reducing oxidative stress can contribute to enhancing the umami in food.

Furthermore, when tyrosine is used alone, its solubility is very low, making it unsuitable as a food additive ingredient. However, it has been found that, by using a tyrosine-amino acid peptide, the solubility increases, allowing for the preparation of solutions while also enhancing umami.

Therefore, it is anticipated that the tyrosine-amino acid peptide, which is capable of enhancing umami, can be utilized in the market for umami-enhancing food additives, as well as in the production of functional health foods and pharmaceutical additives with anti-oxidative effects. These applications align with the trend of natural and consumer-friendly products, and thus it is expected that there is a very high market potential and prospects for commercialization.

DETAILED DESCRIPTION

Figure 1:
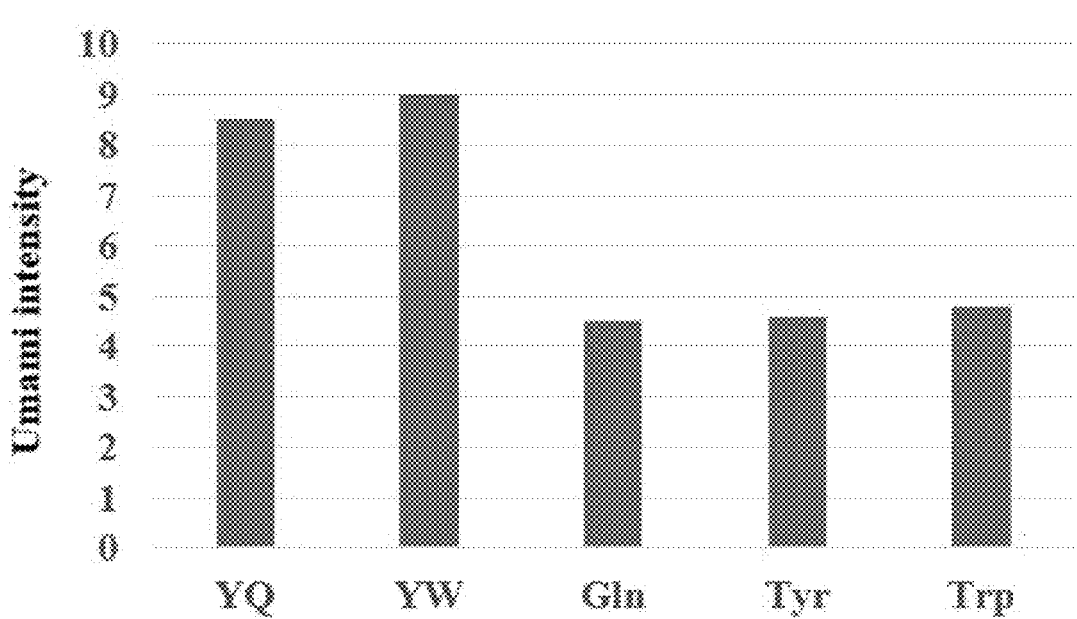
FIG. 1 is a graph in which the umami intensity is compared among tyrosine-glutamine peptide, tyrosine-tryptophan peptide, glutamine, tyrosine, and tryptophan.

To achieve the object of the present invention, the present invention provides a composition for enhancing umami comprising tyrosine-amino acid peptide as effective component.

In the composition for enhancing umami described in the present invention, the aforementioned amino acid can be any one of 20 naturally occurring amino acids, specifically lysine, methionine, valine, serine, cysteine, arginine, asparagine, aspartic acid, alanine, isoleucine, leucine, threonine, tyrosine, glutamine, glutamic acid, glycine, histidine, phenylalanine, proline, or tryptophan. More specifically, it can be glutamine or tryptophan, but it is not limited thereto.

Furthermore, in the composition for enhancing umami described in the present invention, glutamine may be additionally comprised as an effective component, but it is not limited thereto.

Additionally, in the composition for enhancing umami described in the present invention, the tyrosine-amino acid peptide can be preferably comprised at 0.001 to 10% based on the total weight of the composition. More preferably, it can be comprised at 0.005 to 2%, and most preferably, at of 0.01 to 1%.

The present invention further provides a processed food for enhancing umami comprising the above composition.

There are no specific limitations on the types of processed food. Examples of the food to which the aforementioned composition can be added include fermented milk, milk, meat products, sausages, soups, stews, broths, hot pots, instant noodles, other noodle dishes, seasoned vegetables, side dishes, sauces, snacks, cookies, pizzas, cooked and scorched rice, ice creams, soups, beverages, teas, drinks, cheese, alcoholic beverages, and others. It encompasses all types of processed foods in the general sense.

The present invention further provides a method for producing a processed food with enhanced umami characterized by mixing a tyrosine-amino acid peptide in food.

In the method for producing a processed food described in the present invention, the mixing is preferably performed by mixing a tyrosine-amino acid peptide in food at 0.01 to 10% by weight. More preferably, it can be mixed at 0.05 to 2% by weight, and most preferably, at 1% by weight, but it is not limited thereto.

Furthermore, in the method for producing a processed food described in the present invention, the aforementioned amino acid can be any one of 20 naturally occurring amino acids, specifically lysine, methionine, valine, serine, cysteine, arginine, asparagine, aspartic acid, alanine, isoleucine, leucine, threonine, tyrosine, glutamine, glutamic acid, glycine, histidine, phenylalanine, proline, or tryptophan. More specifically, it can be glutamine or tryptophan, but it is not limited thereto.

Furthermore, in the method for producing a processed food described in the present invention, additional mixing of glutamine can be made at the time of aforementioned mixing. More specifically, glutamine can be mixed in food at 0.01 to 10% by weight, more specifically 0.05 to 2% by weight, and most specifically at 1% by weight.

The present invention further provides a processed food with enhanced umami produced by the above method.

The present invention still further provides a method for enhancing umami of processed food characterized by mixing a tyrosine-amino acid peptide in food.

In the method for enhancing umami of processed food described in the present invention, the amino acid is the same as those described in the above.

Hereinbelow, the present invention is explained in greater detail in view of the Examples. However, the following Examples are given only for exemplification of the present invention and the scope of the present invention is not limited by them.

EXAMPLES

1. Materials

The tyrosine (Y)-glutamine (Q) peptide used in the present invention was synthesized by a peptide synthesis company such that it has purity of 95% or higher.

TABLE 1

| Analysis of YQ peptide | |
| --- | --- |
| Item | Result |
| Sequence | H-Tyr-Gln-OH |
| Molecular Formula | $C_{14}H_{19}N_3O_5$ |
| Molecular Weight | 309.32 |
| Suggested Solvent (or solvent 1.0 mg peptide soluble in 1.0 ml DMSO used in purification) | |
| Purity | 98.81% |

The tyrosine (Y)-tryptophan (W) peptide was also synthesized by a peptide synthesis company such that it has purity of 95% or higher.

TABLE 2

| Analysis of YW peptide | |
| --- | --- |
| Item | Result |
| Sequence | H-Tyr-Trp-OH |
| Molecular Formula | $C_{20}H_{21}N_3O_4$ |
| Molecular Weight | 367.39 |
| Suggested Solvent (or solvent 1.0 mg peptide soluble in 1.0 ml DMSO used in purification) | |
| Purity | 96.07% |

2. Experimental Methods 2.1. Exploring Taste Components of Yogurt Sample Using Electronic Tongue The yogurt samples used were Bulgaris ($Y_1$), Maeil Bio ($Y2$), and Activia ($Y_3$). Each yogurt sample was analyzed for taste components with the addition of 1% glutamine (Gln), 1% tyrosine-glutamine peptide (Tyr-Gln), or a combination of 1% glutamine and 1% tyrosine-glutamine peptide (Gln_1%_Tyr-Gln).

TABLE 3

| Comparison among test samples added to yogurt | | | | |
| --- | --- | --- | --- | --- |
| #1 | $Y_1$ | $Y_1$_Gln_1% | $Y_1$_Tyr-Gln_1% | $Y_1$_Gln_1%_Tyr-Gln_1% |

TABLE 3-continued

| Comparison among test samples added to yogurt | | | |
|---|---|---|---|
| #2 | $Y_2$  $Y_2$_Gln_1% | $Y_2$_Tyr-Gln_1% | $Y_2$_Gln_1%_Tyr-Gln_1% |
| #3 | $Y_3$  $Y_3$_Gln_1% | $Y_3$_Tyr-Gln_1% | $Y_3$_Gln_1%_Tyr-Gln_1% |

The taste component pattern of the yogurt samples was analyzed by using an electronic sensor. Specifically, the analysis was conducted by using an electronic tongue system (ASTREE, Alpha MOS, Toulouse, France) equipped with sensors for five basic taste components perceived by humans: sourness (SRS), saltiness (STS), umami (UMS), sweetness (SWS), and bitterness (BRS). Additional sensors, GPS and SPS, were used as reference values for calibration. For analysis of the water-soluble taste components, 10 mL of the test sample were dissolved in 90 mL of purified water in a vial specifically designed for electronic tongue analysis. The sample solution was then loaded into the sampler of the electronic tongue system. The sensors were immersed in the sample solution for 2 minutes to measure, through contact with the sample, the intensity of taste components associated with each sensor. To minimize errors from cross-contamination between samples, the sensors were washed with purified water between each analysis. Individual results were obtained as taste pattern for each taste component, and the taste component pattern among the samples was examined through principal component analysis (PCA).

2.2. Search for Taste Components in Purified Water Sample Using Electronic Tongue Each sample (10 mg) was dissolved in 100 mL of purified water and injected into the vial for electronic tongue analysis. To remove solid particles and fine particles that could interfere with the analysis, the samples were pre-treated by filtration to give liquid samples. The sample solution was loaded into the sampler of the electronic tongue system. The sensors were immersed in the sample solution for 2 minutes to measure, through contact with the sample, the intensity of taste components associated with each sensor. To minimize errors from cross-contamination between samples, the sensors were thoroughly washed with purified water between each analysis, and then used for the next sample analysis. Each sample was repeatedly analyzed five times.

Furthermore, to investigate a change in umami of tyrosine peptide in response to pH variations, experiments were conducted at acidic, neutral, and alkaline pH ranges. The pH values used were 4.0, 7.0, and 10.0. Buffer solutions containing citric acid were utilized for the experiments.

Example 1. Comparison with Amino Acids

The relative comparison between tyrosine (Y)-glutamine (Q) peptide, tyrosine (Y)-tryptophan (W) peptide, and the amino acids glutamine (Gln), tyrosine (Tyr), and tryptophan (Trp) as the amino acids that are associated with umami was made using an electronic tongue, and the results are shown in FIG. 1. It was observed that the umami intensity of YQ and YW peptides was almost twice as strong as the individual amino acids Gln, Tyr, and Trp at the same concentration, indicating their superior umami-enhancing property.

Example 2. Change in Umami with Respect to pH

The stability of the umami intensity of tyrosine (Y)-glutamine (Q) peptide, tyrosine (Y)-tryptophan (W) peptide in the general acidic, neutral, and alkaline pH ranges was compared using an electronic tongue, and the results are presented in Table 4. It was consequently observed that there was no significant change in umami intensity with respect to pH variations in each pH range. Therefore, it can be concluded that the umami components present in the two samples have stability against pH variations.

TABLE 4

| Change in umami with respect to pH | | | |
|---|---|---|---|
| Umami | Control (citric acid buffer) | YQ | YW |
| pH 4.0 | 4.0 | 7.9 | 8.0 |
| pH 7.0 | 4.0 | 8.0 | 8.0 |
| pH 10.0 | 4.0 | 8.0 | 8.0 |

Figure 2:
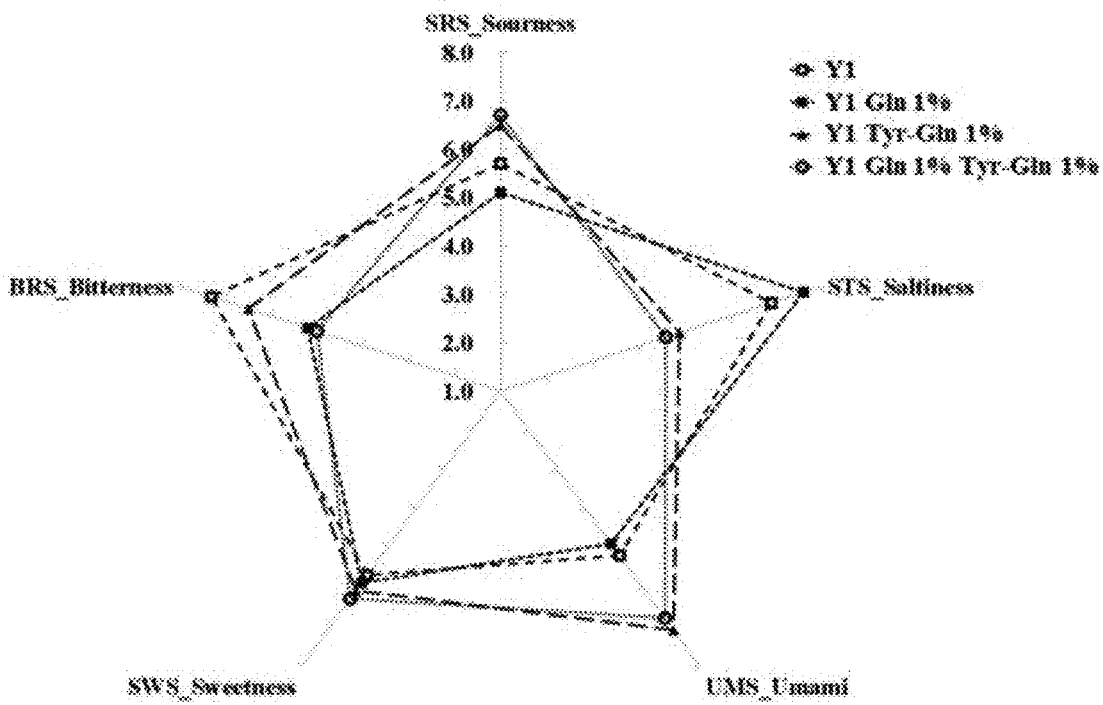
FIG. 2 is a photographic image for analyzing the taste components in fermented milk product of Bulgaris with the addition of glutamine, tyrosine-glutamine peptide, or glutamine+tyrosine-glutamine peptide.

Example 3. Taste Components in Yogurt Sample Examined by Using Electronic Tongue The analysis of taste components in Bulgaris resulted in the following findings, as shown in Table 5. Bulgaris without any additives ($Y_1$) exhibited the strongest bitterness. When only glutamine was added to Bulgaris ($Y_1$Gln 1%), the bitterness decreased, but saltiness was the most pronounced. In the sample with the addition of tyrosine-glutamine peptide to Bulgaris ($Y_1$Tyr-Gln 1%), the umami was the highest. Lastly, in the sample in which both glutamine and tyrosine-glutamine peptide were added to Bulgaris ($Y_1$Gln 1% Tyr-Gln 1%), bitterness decreased while umami and sourness increased (FIG. 2).

TABLE 5

| Taste components in yogurt sample (Bulgaris) examined by using electronic tongue | | | | | |
|---|---|---|---|---|---|
| E-tongue | SRS_Sourness | STS_Saltiness | UMS_Umami | SWS_Sweetness | BRS_Bitterness |
| $Y_1$ | 5.7 | 6.9 | 5.2 | 5.7 | 7.3 |
| $Y_1$ Gln 1% | 5.1 | 7.6 | 4.9 | 5.9 | 5.2 |
| $Y_1$ Tyr-Gln 1% | 6.5 | 4.9 | 7.1 | 6.1 | 6.5 |
| $Y_1$ Gln 1% Tyr-Gln 1% | 6.7 | 4.6 | 6.8 | 6.3 | 5.0 |

Figure 3:
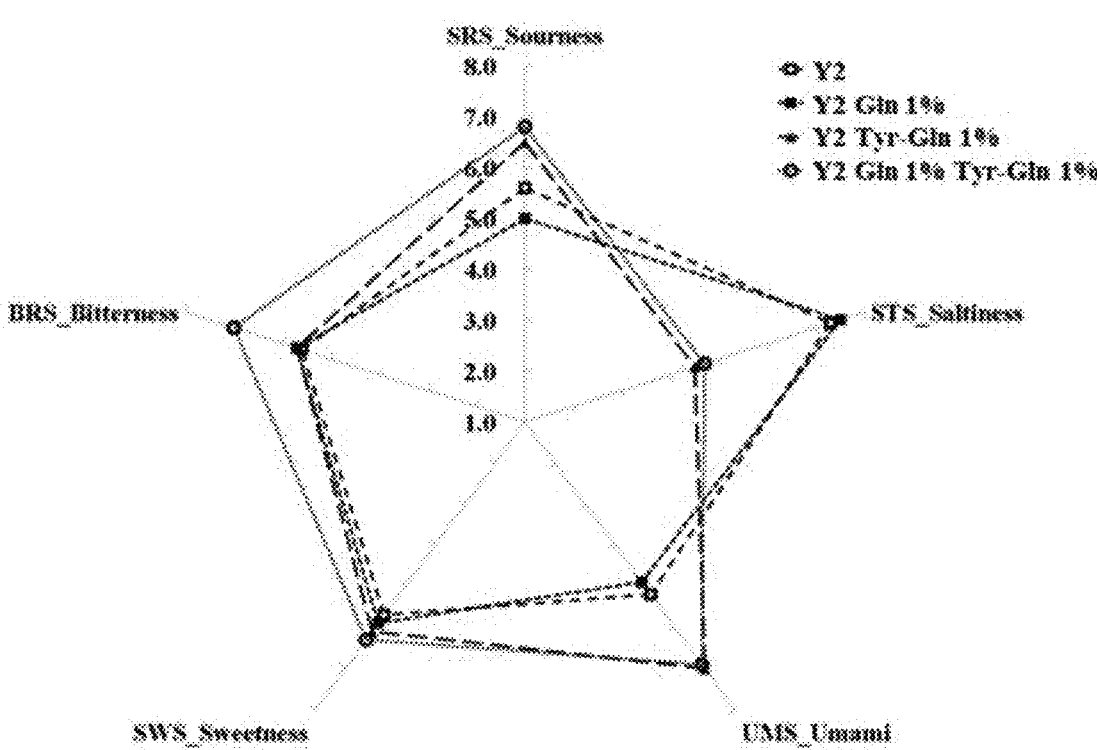
FIG. 3 is a photographic image for analyzing taste components in fermented milk product of Maeil Bio with the addition of glutamine, tyrosine-glutamine peptide, or glutamine+tyrosine-glutamine peptide.

The analysis of taste components in the Maeil Bio resulted in the following findings, as shown in Table 6. Maeil Bio without any additives ($Y_2$) exhibited a strong saltiness, and the sample with the addition of glutamine ($Y_2$Gln 1%) showed a similar strong saltiness. In the sample with the addition of tyrosine-glutamine peptide to Maeil Bio ($Y_2$Tyr-Gln 1%), the umami was the highest. Lastly, in the sample in which both glutamine and tyrosine-glutamine peptide were added to Maeil Bio ($Y_2$Gln 1% Tyr-Gln 1%), bitterness, umami, and sourness increased (FIG. 3).

TABLE 6

| Taste components in yogurt sample (Maeil Bio) examined by using electronic tongue | | | | | |
|---|---|---|---|---|---|
| E-tongue | SRS_Sourness | STS_Saltiness | UMS_Umami | SWS_Sweetness | BRS_Bitterness |
| $Y_2$ | 5.6 | 7.3 | 5.2 | 5.7 | 5.6 |
| $Y_2$ Gln 1% | 5.0 | 7.5 | 4.9 | 5.9 | 5.7 |
| $Y_2$ Tyr-Gln 1% | 6.5 | 4.5 | 7.0 | 6.1 | 5.7 |
| $Y_2$ Gln 1% Tyr-Gln 1% | 6.8 | 4.7 | 6.9 | 6.3 | 7.0 |

Figure 4:
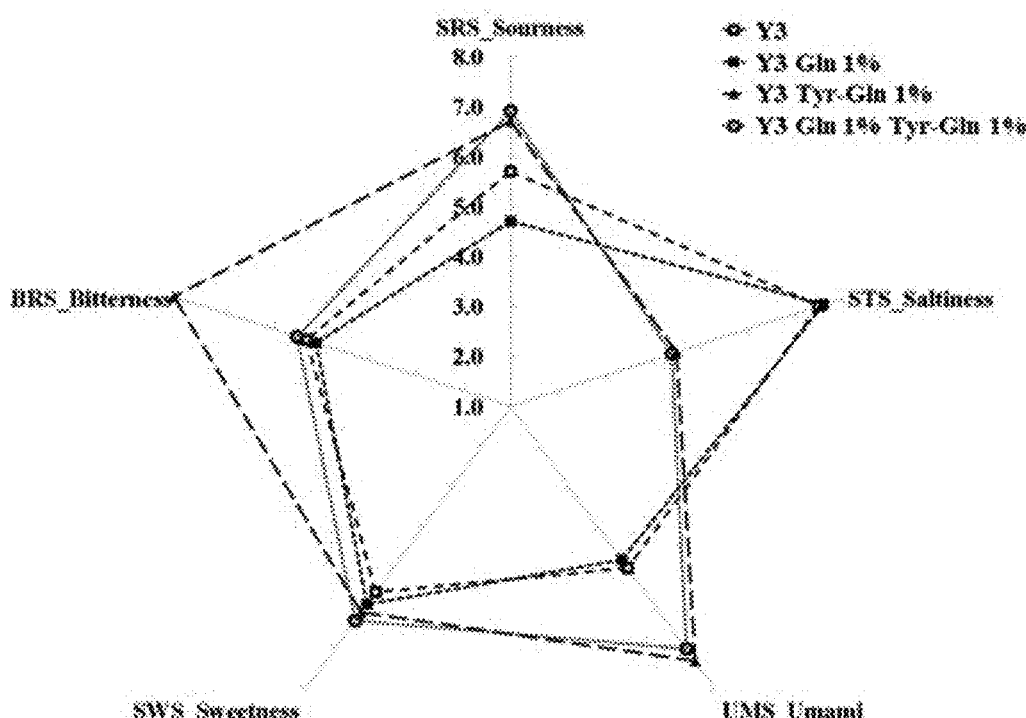
FIG. 4 is a photographic image for analyzing the taste components in fermented milk product of Activia with the addition of glutamine, tyrosine-glutamine peptide, or glutamine+tyrosine-glutamine peptide.

The analysis of taste components in Activia resulted in the following findings, as shown in Table 7. Activia without any additives ($Y_3$) exhibited a strong saltiness, and the sample with the addition of glutamine ($Y_3$Gln 1%) showed a similar strong saltiness. In the sample with the addition of tyrosine-glutamine peptide to Activia ($Y_3$Tyr-Gln 1%), the umami and bitterness were the highest. Lastly, in the sample in which both glutamine and tyrosine-glutamine peptide were added to Activia ($Y_3$Gln 1% Tyr-Gln 1%), the umami and sourness increased (FIG. 4).

TABLE 7

| Taste components in yogurt sample (Activia) examined by using electronic tongue | | | | | |
|---|---|---|---|---|---|
| E-tongue | SRS_Sourness | STS_Saltiness | UMS_Umami | SWS_Sweetness | BRS_Bitterness |
| $Y_3$ | 5.7 | 7.5 | 5.0 | 5.6 | 5.3 |
| $Y_3$ Gln 1% | 4.7 | 7.6 | 4.8 | 5.9 | 5.1 |
| $Y_3$ Tyr-Gln 1% | 6.7 | 4.5 | 7.3 | 6.1 | 8.1 |
| $Y_3$ Gln 1% Tyr-Gln 1% | 6.9 | 4.4 | 7.0 | 6.3 | 5.5 |

What is claimed is:

1. A processed food with enhanced umami, comprising a composition comprising a dipeptide comprising tyrosine at the N-terminus and an amino acid at the C-terminus as effective component, wherein the amino acid is glutamine, and where the content of the dipeptide by weight of the processed food is 0.05 to 2%.

2. The processed food of claim 1, wherein the composition further comprises glutamine.

3. A method for producing a processed food with enhanced umami, the method comprising:

mixing a dipeptide comprising tyrosine at the N-terminus and an amino acid at the C-terminus with a food, wherein the amino acid is glutamine, and wherein the dipeptide is mixed with the food at 0.05 to 2% by weight relative to the food.

4. The method according to claim 3, wherein glutamine is additionally mixed with the food at 0.01 to 10% by weight.

5. A processed food with enhanced umami produced by the method of claim 3.

6. A method for enhancing umami of food, the method comprising: mixing a dipeptide comprising tyrosine at the N-terminus and an amino acid at the C-terminus with the food, wherein the amino acid is glutamine, and wherein the dipeptide is mixed with the food at 0.05 to 2% by weight relative to the food.

7. The method of claim 6, wherein glutamine is additionally mixed in food at 0.01 to 10% by weight.

\* \* \* \* \*